United States Patent [19]

Meining et al.

[11] Patent Number: 4,547,084
[45] Date of Patent: Oct. 15, 1985

[54] CAGE FOR ROLLER BEARINGS

[75] Inventors: Hans Meining, Dittelbrunn; Rüdiger Hans, Niederwerrn, both of Fed. Rep. of Germany

[73] Assignee: SKF Kugellagerfabriken GmbH, Schweinfurt, Fed. Rep. of Germany

[21] Appl. No.: 657,593

[22] Filed: Oct. 4, 1984

[30] Foreign Application Priority Data

Oct. 12, 1983 [DE] Fed. Rep. of Germany ... 8329410[U]

[51] Int. Cl.$^4$ ............................................. F16C 33/56
[52] U.S. Cl. .................................................... 384/576
[58] Field of Search ............... 384/576, 580, 527, 572, 384/523

[56] References Cited

U.S. PATENT DOCUMENTS

| 1,327,003 | 1/1920 | Wilson | 384/580 |
| 3,892,447 | 7/1975 | Gruber et al. | 384/576 |
| 4,222,620 | 9/1980 | Mirring | 384/576 |

FOREIGN PATENT DOCUMENTS 2115889  9/1983  United Kingdom ............... 384/576

Primary Examiner—Lenard A. Footland
Attorney, Agent, or Firm—Eugene E. Renz, Jr.

[57] ABSTRACT

A cage for roller bearings made of a plastic material consisting of two annular side parts and a plurality of circumferentially spaced crosspieces joining the side parts to form pockets for the rolling elements, said pockets including elastically deformable retaining projections for guiding said rolling elements and retaining them in the cage, said side parts having a U-shaped cross-section with axially outwardly directed shanks and said crosspieces consisting of two thin-walled, curved parts which are arranged around the periphery at a predetermined distance from one another, the outer surfaces of these parts being arranged to face each other.

9 Claims, 7 Drawing Figures

CAGE FOR ROLLER BEARINGS

BACKGROUND OF THE INVENTION

The present invention relates to a cage for roller bearings and specifically to an improved plastic cage for cylindrical roller bearings. The cage consists of a pair of spaced annular side bars and a plurality of crosspieces which join the side bars to form pockets for holding the rolling elements. The rolling elements are guided by elastically deformable retaining projections in the pockets in a manner to prevent them from falling out and thus the cage and the rolling elements form an integral unitary assembly.

Cages of this general type are not new per se. For example, West German Registered Design No. 7,625,839 shows a cage produced by casting or injection molding. However, this cage requires a large amount of material, especially in the large sizes and consequently they cool relatively slowly in the mold so that the production quantities per unit time are relatively low. It has also been found that the dimensional accuracy of these prior cages is not satisfactory.

SUMMARY OF THE INVENTION

With the foregoing in mind, it is an object of the present invention to provide a cage for roller bearings which requires a relatively small amount of casting material even for the large sizes so that the cage cools more rapidly in the mold and higher production quantities can thus be achieved.

It is also an object of the present invention to provide a cage characterized by novel features of construction and arrangement including retaining projections on the crosspieces which yield elastically and are not overextended when the radial slide bar is pulled over and also, when the rolling elements are inserted.

To this end, in accordance with the present invention, the annular side parts of the cage are of a U-shaped cross section having axially oriented shanks or leg portions wherein the crosspieces for each cage pocket comprises two thin-walled arcuate segments which are arranged around the periphery a predetermined distance from one another and wherein the outer surfaces of these segments confront and face one another.

In accordance with a modified form of the cage of the present invention, a connecting section is provided between the crosspieces, which connecting section has a length corresponding to the distance between the annular side parts and extends in the axial direction to one side of the pitch circle preferably below it.

In accordance with still another modification of the cage of the present invention, a connecting section is provided between the crosspieces defining the cage pockets which is located above the pitch circle of the set of rollers and has radially inwardly directed recesses adjacent the annular side parts or elements. The crosspieces project freely below the pitch circle and extend over the annular side parts and into the cage bore. In this manner, the retaining projections of the crosspieces are free to yield elastically so that the elongation capacity of the material is not exceeded when the radial slide bar is removed from the mold. Further, in accordance with this embodiment of the invention, the pressing forces required to insert the rolling elements into the cage pockets is very low. In order to increase the strength of the cage, it is also advantageous to stiffen the U-shaped side parts by means of ribs. Additionally, in order to obtain optimum injection molding, that is, to facilitate rapid filling of the mold cavities, the cross sections of the crosspieces are relatively thin-walled and are of equal thickness. In this manner, better seam strengths are obtained and the danger of cage fracture is considerably reduced.

BRIEF DESCRIPTION OF THE DRAWINGS

These and other objects of the present invention and the various features and details of the operation and construction thereof are hereinafter more fully set forth with reference to the accompanying drawings, wherein.

DESCRIPTION OF THE PREFERRED EMBODIMENTS

Figure 1:
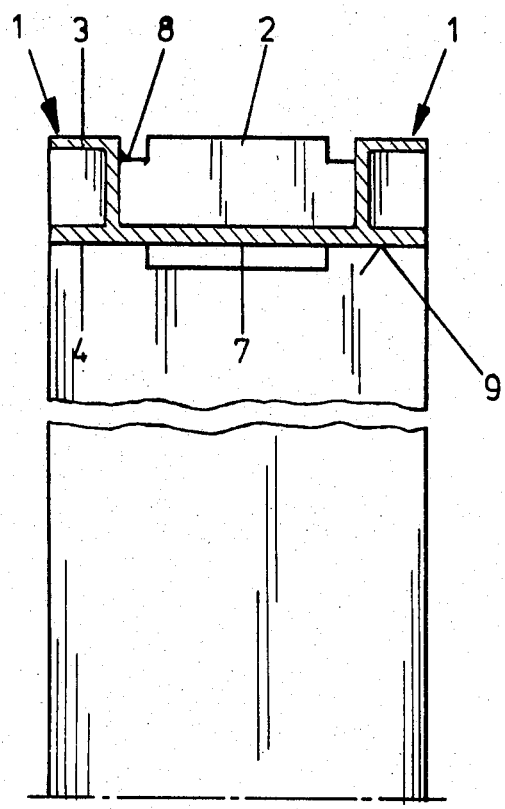
FIG. 1 is a transverse sectional view of a plastic cage for cylindrical roller bearings made in accordance with the present invention.
Figures 2, 3:
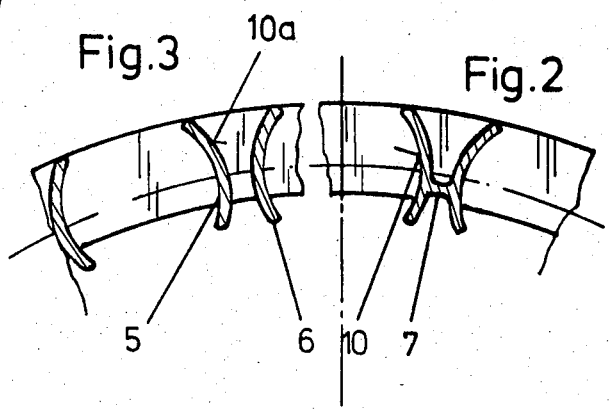
FIG. 2 is a transverse fragmentary radial section showing a portion of the cage of FIG. 1.
FIG. 3 show another embodiment of plastic cage in accordance with the present invention as viewed in radial cross section.

Referring now to the drawings and particularly to FIGS. 1 and 2 thereof, there is illustrated a plastic cage for roller bearings made in accordance with the present invention. As illustrated, the cage is of generally ring-like configuration comprising a pair of annular circumferentially extending side parts 1 and a plurality of circumferentially spaced axially extending crosspieces extending between the annular side parts 1. As illustrated in FIG. 1, the side parts are of generally U-shaped cross section wherein the legs or shanks 3 and 4 project axially outwardly. In the embodiment illustrated, the crosspieces defining one side of the pocket of adjacent pockets consists in each case of two relatively thin arcuate crosspieces elements 5 and 6 which confront one another at their convex sides and are connected to each other by means of a bridge section 7 preferably located below the pitch circle C and extending essentially in an axial direction. The crosspiece portions 5 and 6 above the pitch circle are designed to be elastic by reason of a radially inwardly directed cut out or recess 8 adjacent the base or upstanding portion 1a of the side parts 1. Below the pitch circle, the elasticity of the crosspieces 5 and 6 is achieved since they project freely radially beyond the side parts 1 and into the cage bore 9 in the manner illustrated for example in FIG. 2. The annular side parts 1 and crosspieces 2 of the cage are relatively thin walled sections so that relatively little material is needed and by reason of this construction, the cage cools rather rapidly in the mold during the casting process.

Figure 4:
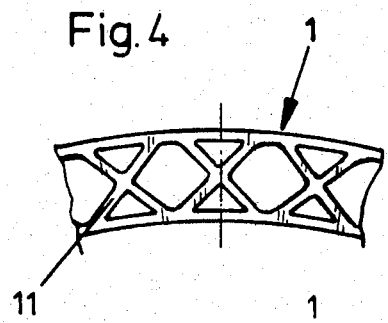
FIGS. 4–7 show various rib configurations for the annular side parts of a cage in accordance with the present invention.
Figure 5:
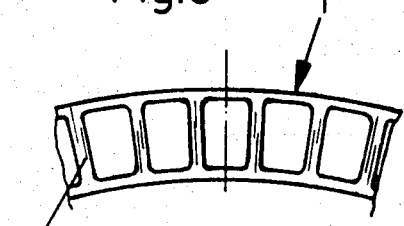
Figure 6:
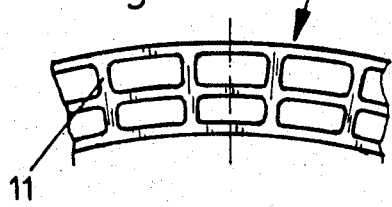
Figure 7:
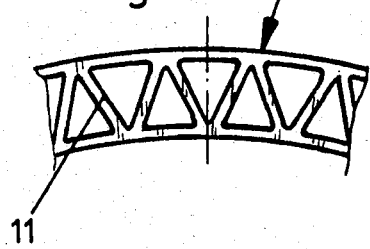

FIG. 3 shows a modification of a cage in accordance with the present invention wherein the axial section 7 between the crosspieces 5 and 6 are omitted. In this instance, the inner surface 10 of each crosspiece which confronts the outer surfaces of the cylindrical rollers, not shown, are concave and the convex outer surfaces 10a face each other. The annular U-shaped side parts in accordance with the cage illustrated in FIGS. 4–7 have stiffening ribs 11 to provide in this manner a cage with relatively thin walls and great strength or rigidity. The stiffening ribs in the form illustrated in FIG. 4 are generally of an X-shaped configuration and designated by the numeral 11a. In FIG. 5, the ribs are circumferentially spaced and radially extending emanating from the center of the cage and are designated 11b. In FIG. 6, the ribs are of a configuration defining a plurality of rectangular openings in the side face of the cage and are designated by the numeral 11c and in FIG. 7, the rib configuration is generally V-shaped and the ribs are identified by the numeral 11d.

While particular embodiments of the present invention have been illustrated and described herein, it is not intended to limit the invention and changes and modifications may be made therein within the scope of the present invention. For example, the radius of the inner surface 10 can be larger than the radius of the cylindrical rollers to minimize the scraping effect of lubricant and thereby enhance the lubrication characteristics of the cage. Additionally, the cage pockets can also be provided with prism-shaped contact surfaces for the rolling elements. These surfaces contribute to the formation of a good lubricant film and provide a reservoir for lubricant.

What is claimed is:

1. A cage for roller bearings made of a plastic material consisting of two annular side parts and a plurality of circumferentially spaced crosspieces joining the side parts to form pockets for the rolling elements, said pockets including elastically deformable retaining projections for guiding said rolling elements and retaining them in the cage, said side parts (1) having a U-shaped cross-section with axially outwardly directed shanks (3, 4) and said crosspieces (2) consisting of two thin-walled, curved parts (5, 6) which are arranged around the periphery at a predetermined distance from one another, the outer surfaces (10a) of these parts being arranged to face each other.

2. A cage according to claim 1, characterized in that an essentially axial connecting section (7) is arranged between the crosspiece parts (5, 6).

3. A cage according to claim 2, characterized in that the connecting section (7) has a length which corresponds to the distance between the side parts (1).

4. A cage according to claim 2, characterized in that the connecting section (7) is arranged on one side of the pitch circle.

5. A cage according to claim 2, characterized in that the connecting section (7) is provided below the pitch circle.

6. A cage according to claim 1, characterized in that the crosspiece parts (5, 6) have radially inward-directed recesses (8) next to the side parts (1).

7. A cage according to claim 1, characterized in that the crosspiece parts (5, 6) are provided below the pitch circle, projecting radially beyond the side parts (1) and projecting freely into the cage bore.

8. A cage according to claim 1, characterized in that the U-shaped side parts (1) are provided with stiffening ribs (11).

9. A cage according to claim 1, characterized in that the side parts (1), the crosspiece parts (5, 6), and the stiffening ribs (11) all have about the same wall thickness.

* * * * *